United States Patent
Alman et al.

(10) Patent No.: US 11,608,909 B2
(45) Date of Patent: Mar. 21, 2023

(54) WEAR INDICATION DEVICE FOR A FLOW CONTROL VALVE

(71) Applicant: FISHER CONTROLS INTERNATIONAL LLC, Marshalltown, IA (US)

(72) Inventors: Paul T. Alman, Marshalltown, IA (US); Andrew J. Kinser, Marshalltown, IA (US); Randall S. Collison, Bondurant, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 303 days.

(21) Appl. No.: 16/791,074

(22) Filed: Feb. 14, 2020

(65) Prior Publication Data
US 2021/0254725 A1 Aug. 19, 2021

(51) Int. Cl.
| F16K 37/00 | (2006.01) |
| F16K 3/32 | (2006.01) |
| F16K 27/04 | (2006.01) |
| G01N 29/09 | (2006.01) |
| G01B 17/04 | (2006.01) |

(52) U.S. Cl.
CPC .......... *F16K 37/0041* (2013.01); *F16K 3/32* (2013.01); *F16K 27/041* (2013.01); *F16K 37/00* (2013.01); *F16K 37/0008* (2013.01); *G01B 17/04* (2013.01); *G01N 29/09* (2013.01)

(58) Field of Classification Search
CPC .. F16K 37/0008; F16K 37/0041; F16K 37/00; F16K 3/32; F16K 27/041; G01B 17/02; G01B 17/04; G01N 29/09
See application file for complete search history.

(56) References Cited

U.S. PATENT DOCUMENTS

| 1,977,177 | A | * | 10/1934 | De Flores | ................. B01J 19/02 285/179 |
| 4,778,104 | A | * | 10/1988 | Fisher | ........................ F16K 1/40 236/80 R |
| 5,509,446 | A | * | 4/1996 | Bey | ........................... F16K 5/12 251/127 |
| 2011/0006241 | A1 | * | 1/2011 | Wilke | ................. F16K 37/0083 251/366 |
| 2014/0061528 | A1 | * | 3/2014 | Davies | .................... F16K 47/08 251/366 |
| 2019/0086000 | A1 | | 3/2019 | Junk et al. | |

OTHER PUBLICATIONS

Fisher HP Series Control Valves, HP (Globe Valve), HPA (Angle Valve), Product Bulletin 51.2:HP (Jan. 2019).

* cited by examiner

*Primary Examiner* — Atif H Chaudry
(74) *Attorney, Agent, or Firm* — Marshall, Gerstein & Borun LLP (57) ABSTRACT

A flow control device includes a valve body having an inlet, an outlet, and a flow path connecting the inlet and the outlet. A flow vane is coupled to the valve body and disposed in the flow path to divide a flow of fluid through the valve body. The flow vane has a first surface, a second surface, and a corrugation formed on at least one of the first and second surfaces. A control element is disposed in the flow path and movable in the valve body between an open position and a closed position.

18 Claims, 5 Drawing Sheets

WEAR INDICATION DEVICE FOR A FLOW CONTROL VALVE

FIELD OF DISCLOSURE

The present disclosure generally relates to a flow control valve, and, more particularly, a flow vane of a flow control valve.

BACKGROUND

In some control valves, unwanted noise is produced by fluctuating pressure waves that arise from fluid flowing through the control valve. Hydrodynamic noise, for example, may be caused by cavitation, which is the formation and collapse of vapor cavities of a flow stream subject to rapid pressure changes. When the vapor cavities in the fluid are subject to higher pressure, the vapor cavities implode and can generate an intense shock wave that can damage internal portions of the valve or produce audible noise. Damage from cavitation can happen gradually, and if discovered early enough, valve parts can be replaced to avoid leaks and/or valve failure.

SUMMARY

In accordance with a first exemplary aspect, a flow control device may include a valve body having an inlet, an outlet, and a flow path connecting the inlet and the outlet. A flow vane may be coupled to the valve body and disposed in the flow path to divide a flow of fluid through the valve body. The flow vane may have a first surface, a second surface, and a corrugation formed on at least one of the first and second surfaces. A control element may be disposed in the flow path and movable in the valve body between an open position and a closed position.

In accordance with a second exemplary aspect, a valve body may include an inlet, an outlet, and a flow path connecting the inlet and the outlet. A valve port may be disposed between the inlet and the outlet. An outlet passage may connect the valve port and the outlet. A flow vane may be coupled to the valve body and disposed in the outlet passage. The flow vane may have a corrugation disposed at a first end of the flow vane.

In accordance with a third exemplary aspect, method of determining wear due to cavitation may include providing a flow control device having a valve body with an inlet, an outlet, and a flow path connecting the inlet and the outlet. A control element may be disposed in the flow path and movable in the valve body between an open position and a closed position. A flow vane may be coupled to the valve body and disposed in the flow path to divide a flow of fluid through the valve body. The flow vane may have a first surface, a second surface, and a corrugation formed on at least one of the first and second surfaces. The method may include measuring a dimension of the flow vane at a location along a length of the flow vane and comparing a first measurement and a second measurement of the dimension of the flow vane taken at the location. Finally, the method may include determining wear on flow vane based on comparing the first and second measurements of the dimension.

In further accordance with any one or more of the foregoing first, second, or third aspects, a flow control device, a valve body, or a method of determining wear due to cavitation may include one or more of the following preferred forms.

In a preferred form, the flow vane may be disposed between the control element and the outlet.

In a preferred form, the corrugation may include a ridge disposed in parallel relative to the direction of flow.

In a preferred form, the corrugation may include a ridge disposed perpendicularly relative to the direction of flow.

In a preferred form, the corrugation may include a raised peak.

In a preferred form, the corrugation may include an indentation.

In a preferred form, the flow vane may be integrally formed with the valve body.

In a preferred form, the flow vane may be removably coupled to the valve body.

In a preferred form, an ultrasonic transducer may be coupled to the valve body and configured to measure a thickness of the flow vane.

In a preferred form, a sensor may be coupled to the control element to measure a distance between the control element and a first end of the flow vane.

In a preferred form, the corrugation may include a plurality of raised bumps.

In a preferred form, the corrugation may be formed on a first surface and a second surface of the flow vane.

In a preferred form, the flow vane may be integrally formed with the valve body.

In a preferred form, the flow vane may be removably coupled to the valve body.

In a preferred form, an array of sensors may be coupled to the valve body and configured to measure a thickness of the flow vane.

In a preferred form, each sensor may be arranged along a length of the flow vane.

In a preferred form, a sensor may be coupled to the flow vane to measure a thickness of the flow vane.

In a preferred form, a sensor may be coupled to the flow vane to measure wear on the flow vane.

In a preferred form, measuring a thickness may include using an ultrasonic transducer to measure the thickness of the flow vane at the location.

DETAILED DESCRIPTION

Figure 1:
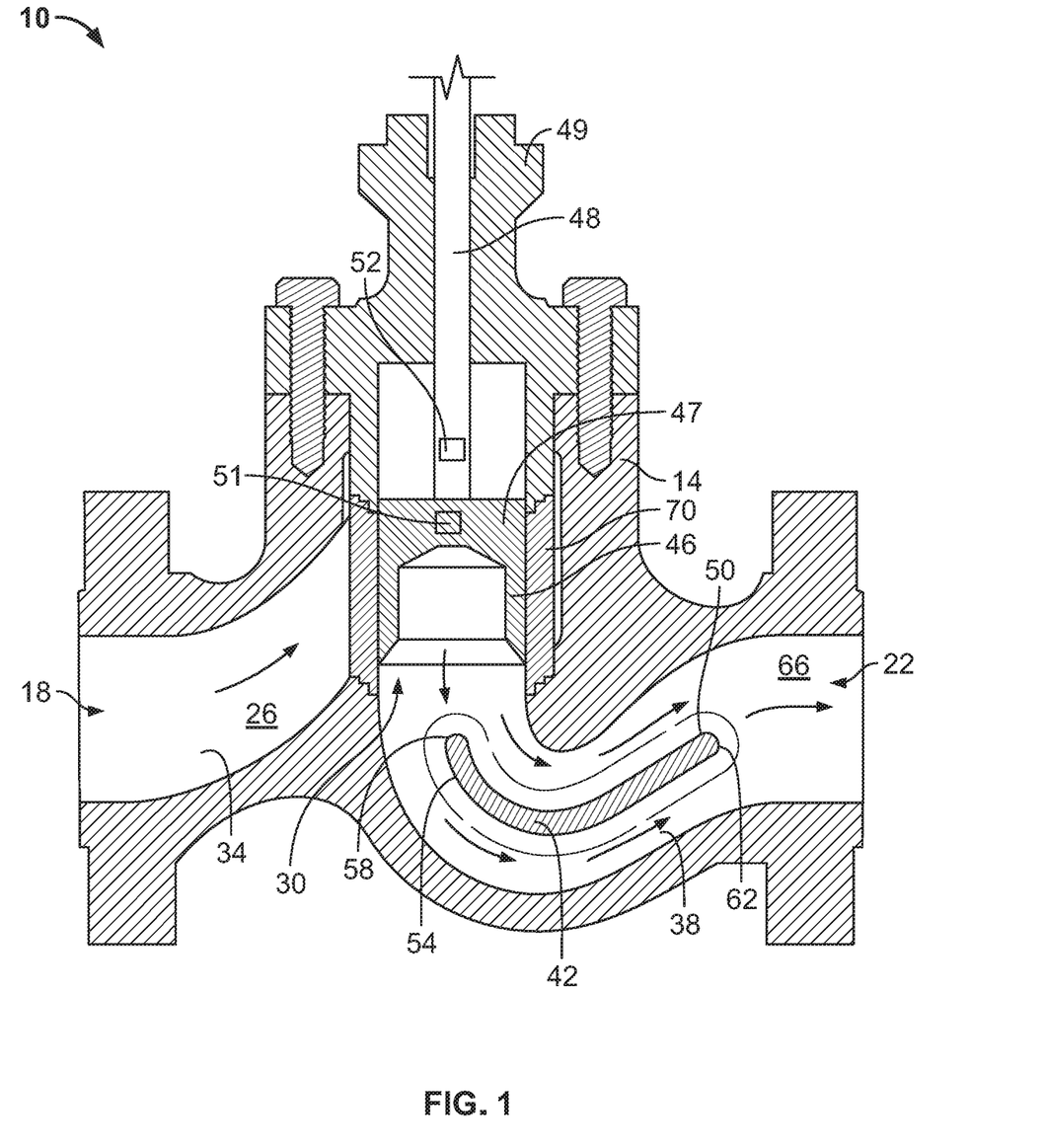
FIG. 1 is a side cross-sectional view of a first exemplary flow control valve having a first exemplary valve body and flow vane assembled in accordance with the teachings of the present disclosure.

The present disclosure provides a detection device and method for detecting wear due to cavitation or erosion on flow control valve components. In FIG. 1, a first exemplary flow control device 10 that indicates wear due to cavitation is constructed in accordance with the teachings of the present disclosure. The flow control device 10 is a sliding stem type control valve (e.g., a Fisher® HP Series valve) that includes a globe-style valve body 14 that defines an inlet 18, an outlet 22, and a flow path 26 connecting the inlet 18 and the outlet 22. The valve body 14 includes a valve port 30 defined between the inlet 18 and the outlet 22, an inlet passage 34, an outlet passage 38, and a flow vane 42. The inlet passage 34 connects the inlet 18 with the valve port 30, and the outlet passage 38 connects the valve port 30 with the outlet 22.

A control element 46 is disposed in the flow path 26 and is movable relative to the valve port 30 in the valve body 14 between an open position and a closed position for controlling the flow of fluid through the valve 10. The fluid may be a gas (e.g., air, natural gas) or a liquid (e.g., water, liquefied natural gas). The control element 46 includes a valve plug 47 connected to a valve stem 48. The valve stem 48 extends out of the valve body 14 through a bonnet 49 and may be connected to an actuator that positions the control element 46, and more particularly, positions the valve plug 47, relative to the flow path 26 to adjust the flow of fluid through the control valve 10. In other examples, the control valve 10 can be a different type of control valve, such as, for example, a flow-up valve, a rotary control valve (e.g., a Fisher® Vee-Ball™ V150 valve, a Fisher® Vee-Ball™ V300 valve, etc.), a throttle valve, an isolation valve, or other control valve. Moreover, the components of the control valve 10 (e.g., the valve body 14, the control element 46, and the bonnet 49) can vary from what is depicted herein. For example, the inlet 18, the outlet 22, and the fluid flow path 26 extending therebetween can vary in shape and/or size and yet still perform the intended functionality.

In the illustrated example, the control valve 10 is a flow-down valve 10 and the flow vane 42 is disposed in the outlet passage 38 between the control element 46 and the outlet 22. The flow vane 42 is coupled to the valve body 14 and is disposed in the flow path 26 to divide the flow of fluid through the valve body 14. The flow vane 42 has a first surface 50 and a second surface 54, and extends in a direction of flow (as indicated by the arrows) between a first end 58 and a second end 62. The first end 58 of the flow vane 42 is proximally located to the valve port 30 (i.e., directly downstream from the valve port 30), and the second end 62 of the flow vane 42 is located downstream from the first end 58 of the flow vane 42. The flow vane 42 is attached to a wall 66 of the valve body 14 to divide the flow path 26, and more specifically the outlet passage 38, such that fluid flows on either side of the first and second surfaces 50, 54 of the flow vane 42. The flow vane 42 may be integrally formed with the valve body 14, formed separately from the valve body 14 and then permanently attached to the valve body 14, for example, by welding the vane 42 to the valve body walls 66, removably coupled to the valve body 14, and/or casted or formed by additive manufacturing. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

The flow vane 42 is used to divide and direct fluid flow through the control valve 10. By dividing fluid flow into multiple passages, as indicated by the flow arrows, the flow vane 14 may prevent momentum from forcing the fluid flow against one particular side over another in the flow path. Notably, the flow vane 14 helps to increase flow distribution across the flow path 26 and thereby increases fluid flow through the control valve 10. The flow vane 42 can also improve distribution of pressure around the circumference of a valve trim 70, thereby providing more stable and controlled flow through the valve 10.

Figure 2:
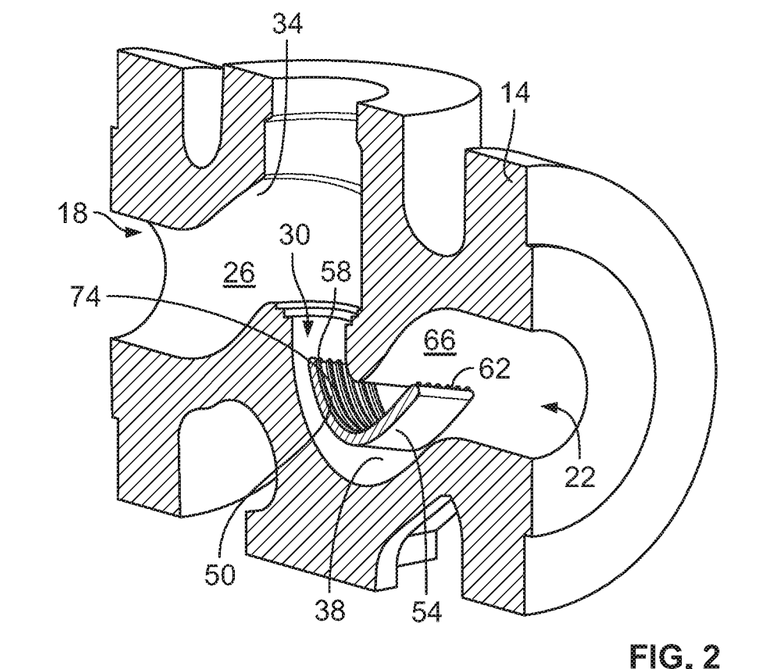
FIG. 2 is a perspective, cross-sectional view of the valve body and flow vane of the flow control valve of FIG. 1.

Turning to FIG. 2, a perspective view of the valve body 14 and flow vane 42 are shown in greater detail. The flow vane 42 has a corrugation 74, which provides a physical indication of the effects of wear due to cavitation. In the presence of cavitating fluid, the corrugation 74 deteriorates, thereby visibly changing in dimension (e.g., shape and size). In this example, the corrugation 74 is in the form of a plurality of ridges 74 formed on the first surface 50. However, in other examples, the corrugation 74 may include one ridge. The plurality of ridges 74 are equally spaced and are disposed in parallel relative to the direction of flow (as indicated by the arrows in FIG. 1). The ridges 74 extend from the first end 58 to the second end 62 of the flow vane 42. However, in other examples, the ridges 74 may extend partially and/or intermittently from the first end 58 to the second end 62 of the flow vane 42. The corrugation 74 may be integrally formed with the first surface 50 of the flow vane 42, or in other examples, the corrugation 74 may be fixedly attached to the first surface 50 and/or the second surface 54. While the ridges 74 in this example are parallel to the direction of flow, in other examples, the ridges 74 may be angled relative to the direction of flow. The corrugation 74 may be machined, cast with the flow vane 42, formed by additive manufacturing, or formed separately from the flow vane 42 and then welded or otherwise fixedly attached to one or more surfaces 50, 54 of the flow vane 42.

An operator can visually inspect the corrugation 74 for any changes to estimate the impact of cavitation on the valve body 14. To examine the flow vane 42, an operator may remove the bonnet 49 and the control element 46 from the valve body 14 to reveal the flow vane 42 through the valve port 30. The flow vane 42 can be used as a gauge for wear and can indicate to an operator when the valve body 14 or certain valve components need replacing. The ridges 74 may indicate wear by a change in dimensions (e.g., width, height) or shape (e.g., round, angular, pointed, etc.) in comparison to the original dimensions and shape of the ridges 74. For example, the ridges 74 may originally have sharp peaks so that each ridge 74 has a triangular cross-section. Wear may be indicated by a rounding of the peaks or a change in height measured from the first surface 50 of the flow vane 42. In some cases, wear or damage to of the corrugation 74 does not affect fluid flow, but may indicate the wear of other areas of the valve body 14 where cavitation occurs. The flow vane 42 can also be a gauge for determining the flow condition present in the valve 10. For example, damage may be identified in different forms, such as, for example, erosion, flashing, or cavitation, and any one of these forms of damage would indicate the type of flow condition presently causing the damage and/or wear.

In addition to (or instead of the corrugation 74), one or more sensors 51, 52, as shown in FIG. 1, may be used in the control valve to determine damage due to cavitation. For example, a laser displacement sensor 51 may be installed integrally in the valve plug 47 of the control element 46, and/or a sensor 52 may be installed in the valve stem 49. The sensors 51, 52 are configured to measure the distance from the control element 46 (in the closed position) to the first end 58 of the vane 42. A change in distance would signify that a gap between the control element 46 and the flow vane 42 has widened, thereby indicating damage to the flow vane 42. The sensors 51, 52 may be coupled to a digital valve controller to automate monitoring of the gap.

Figure 3:
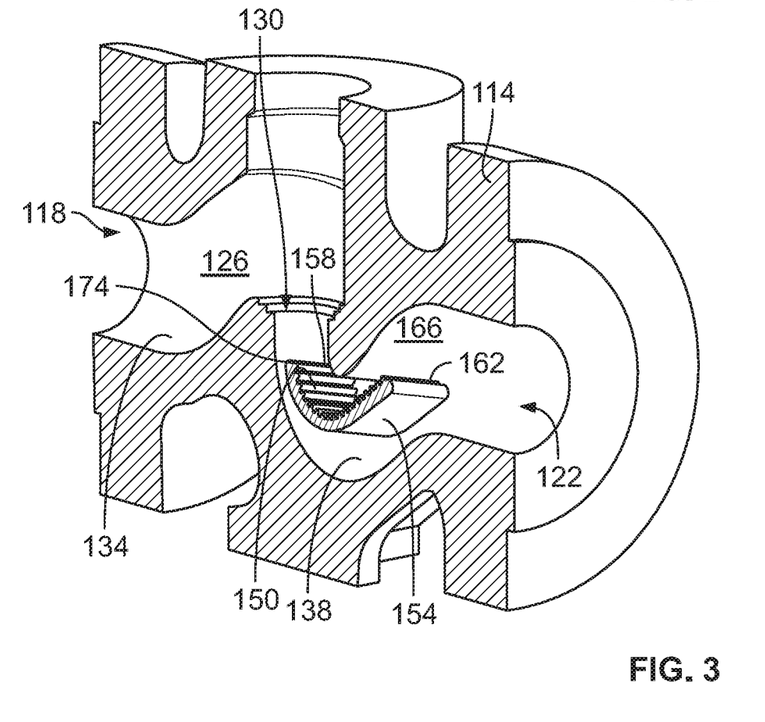
FIG. 3 is a perspective, cross-sectional view of a second exemplary valve body and flow vane of a flow control valve assembled in accordance with the teachings of the present disclosure.

Turning to FIG. 3, a second exemplary flow vane 142 and valve body 114 are constructed in accordance with the teachings of the present disclosure. The second exemplary flow vane 142 and valve body 114 are similar to the first exemplary flow vane 42 and valve body 14, respectively, except that a surface treatment or corrugation 174 of the second exemplary flow vane 142 differs from the corrugation 74 of the first exemplary flow vane 42. Elements of the second exemplary flow vane 142 and valve body 114 that are similar to the elements of the first exemplary flow vane 42 and valve body 14 are designated by the same reference numeral, incremented by 100. A description of many of these elements is abbreviated or even eliminated in the interest of brevity. The flow vane 142 and valve body 114 may be part of a control valve such as the control valve 10 of FIG. 1.

In this example, the flow vane 142 has a corrugation 174 in the form of a plurality of ridges 174 formed on a first surface 150 and perpendicularly disposed relative to a direction of flow (as indicated by the arrows in FIG. 1). The ridges 174 have pointed peaks so that as the peaks smooth down over time, the operator can visibly determine the severity of the wear on the valve body 114 or other valve components due to cavitation. In other examples, the ridges 174 may have rounded peaks or peaks of a different shape.

Figure 4:
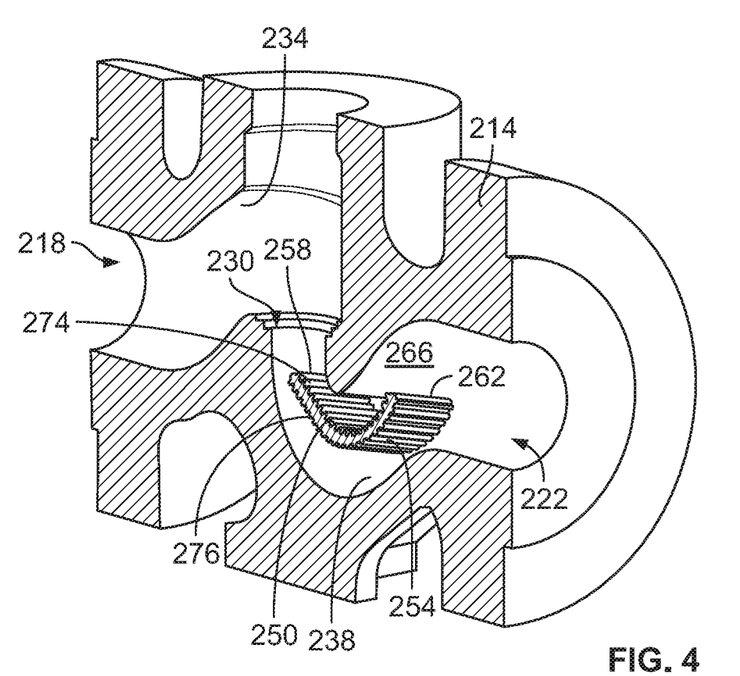
FIG. 4 is a perspective, cross-sectional view of a third exemplary valve body and flow vane of a flow control valve assembled in accordance with the teachings of the present disclosure.

In FIG. 4, a third exemplary flow vane 242 and valve body 214 are constructed in accordance with the teachings of the present disclosure. The third exemplary flow vane 242 and valve body 214 are similar to the second exemplary flow vane 142 and valve body 114, respectively, except that a surface treatment or corrugation 274, 276 of the third exemplary flow vane 242 differs from the corrugation 174 of the second exemplary flow vane 142. Specifically, a first set of ridges 274 is formed on a first surface 250 and a second set of ridges 276 is formed on the second surfaces 254 of the flow vane 242. Elements of the third exemplary flow vane 242 and valve body 214 that are similar to the elements of the second exemplary flow vane 142 and valve body 114 are designated by the same reference numeral, incremented by 100. A description of many of these elements is abbreviated or even eliminated in the interest of brevity.

In this example, the corrugation 274, 276 of the flow vane 242 is formed on both the first surface 250 and the second surface 250 and the ridges 274, 276 are perpendicularly disposed relative to a direction of flow (as indicated by the arrows in FIG. 1). The ridges 274, 276 have pointed peaks so that as the peaks smooth down over time, the operator can visibly determine the severity of the wear on the valve body 214 or other valve components due to cavitation. In other examples, the ridges 274, 275 may have rounded peaks or peaks of a different shape, and the corrugation 274, 276 may extend entirely or partially on one or both surfaces 250, 254 of the flow vane 242.

Figure 5:
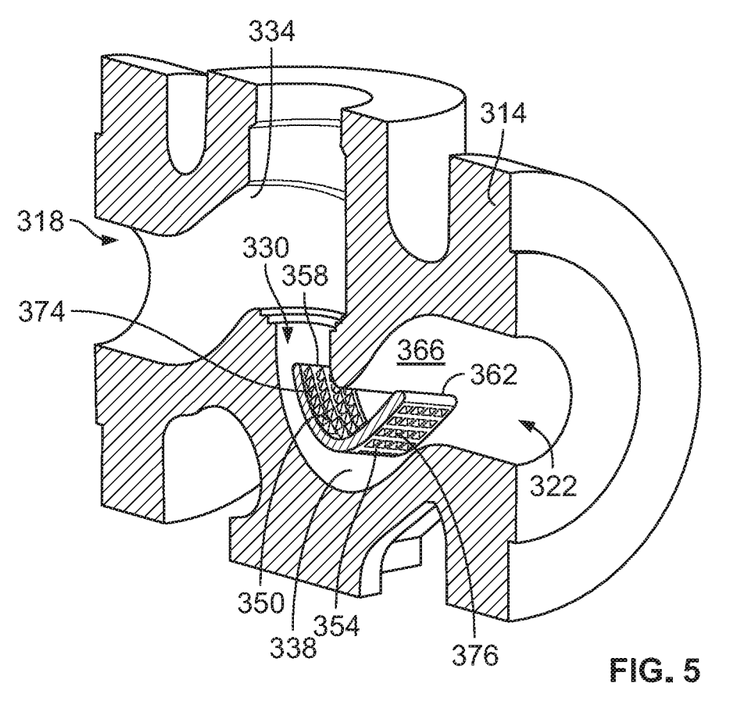
FIG. 5 is a perspective, cross-sectional view of a fourth exemplary valve body and flow vane of a flow control valve assembled in accordance with the teachings of the present disclosure.

In FIG. 5, a fourth exemplary flow vane 342 and valve body 314 are constructed in accordance with the teachings of the present disclosure. The fourth exemplary flow vane 342 and valve body 314 are similar to the third exemplary flow vane 242 and valve body 214, respectively, except that a surface treatment or corrugation 374, 376 of the fourth exemplary flow vane 342 differs from the corrugation 274, 276 of the third exemplary flow vane 242. Elements of the fourth exemplary flow vane 342 and valve body 314 that are similar to the elements of the third exemplary flow vane 242 and valve body 214 are designated by the same reference numeral, incremented by 100. A description of many of these elements is abbreviated or even eliminated in the interest of brevity.

The corrugation 374 of the flow vane 342 is defined by a plurality of grooves and/or ridges forming gridlines. On a first surface 350 of the flow vane 342, a plurality of grooves run in parallel and perpendicularly relative to the direction of flow (as indicated by the arrows of FIG. 1). Between the parallel and perpendicular grooves, a plurality of peaks or raised bumps are formed in a grid. On the second surface 354, gridlines of the corrugation 376 are defined by ridges that run in parallel and perpendicularly relative to the direction of flow such that a grid of indentations 376 or dimples is formed on the flow vane 342. While the illustrated example depicts a grid of peaks 374 on the first surface 350 and a grid of indentations 376 on the second surface 354, in other examples, the peaks 374 may be formed on the second surface 354 and the indentations 376 may be formed on the first surface 350. Further, the corrugations 374, 376 may be constructed in other patterns besides rows and columns to form grids, may include one indentation, one bump, or a combination of indentations or bumps, and may entirely or partially cover one or more of the first and second surfaces 350, 354.

Figure 6:
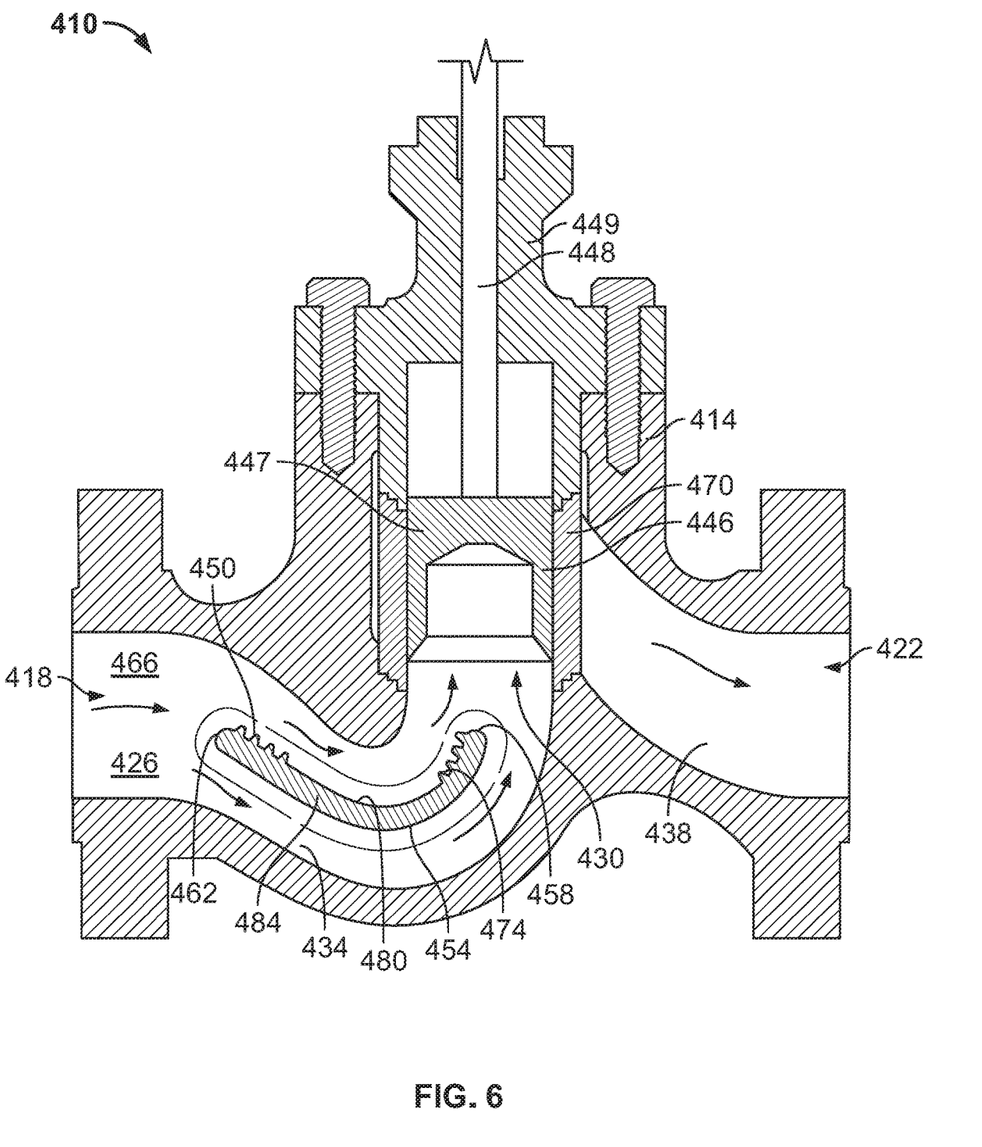
FIG. 6 is a side, cross-sectional view of a fifth exemplary valve body and flow vane of a flow control valve assembled in accordance with the teachings of the present disclosure.

Turning now to FIG. 6, a second exemplary control valve 410 is constructed in accordance with the teachings of the present disclosure. The control valve 410 is similar to the first exemplary control valve 10, except that the second exemplary control valve 410 is a flow-up control valve 410 and a fifth exemplary flow vane 442 is disposed in an inlet passage 434 rather than an outlet passage 438, such as the first exemplary control valve 10 of FIG. 1. The wear on the flow vane 442 of the flow-up valve 410 can indicate damage due to erosion, for example, in a dirty liquid or a wet steam service.

The flow vane 442 has a first end 458 proximally located relative to a valve port 430 (i.e., directly upstream relative to the valve port 430) and a second end 462 is upstream relative to the first end 458. To visually inspect the flow vane 442 for wear due to erosion, an operator can remove a bonnet 449 secured to the valve body 414 and measure the wear on the corrugation 474 disposed at the first end 458. As shown in this example, the corrugation 474 does not extend completely from the first end 458 to the second end 462, and instead the corrugation 474 is disposed locally at the first and second ends 458, 462, leaving a smooth surface 480 on a central portion 484 of the flow vane 474. In other examples, the flow vane 442 may have a different corrugation such as, for example, any one of the corrugations 74, 174, 274, 276, 374, 376 depicted in FIGS. 2-5.

Figure 7:
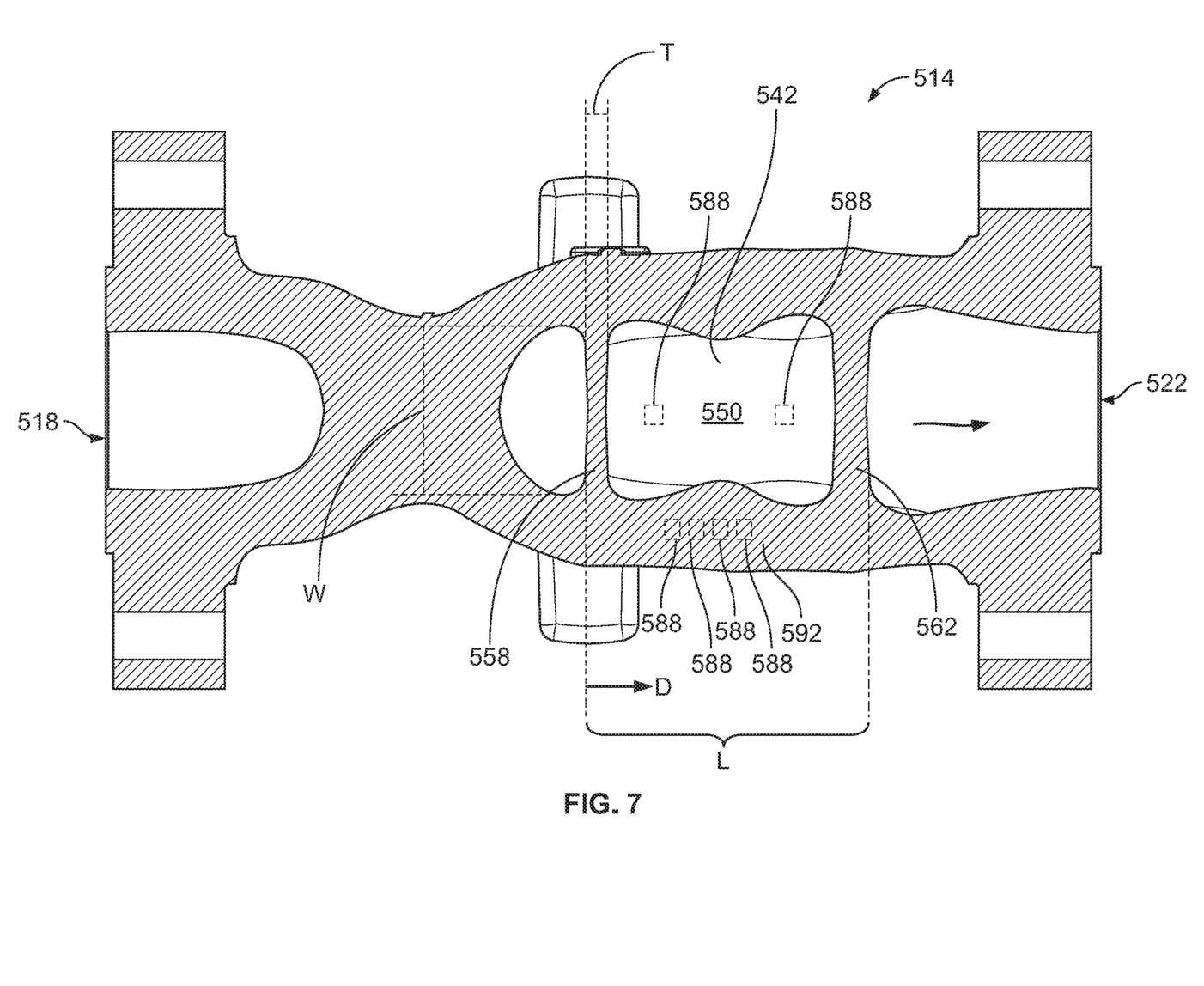
FIG. 7 is a top cross-sectional view of a second exemplary flow control valve having a fifth exemplary valve body and flow vane assembled in accordance with the teachings of the present disclosure.

In another example shown in FIG. 7, a fifth exemplary valve body 514 and flow vane 542 are constructed in accordance with the teachings of the present disclosure. The valve body 514 may be used in a flow-down control valve, such as the flow-down control valve 10 of FIG. 1. However, in another example, the fifth exemplary valve body 514 may be used in a flow-up control valve such as the control valve 410 of FIG. 6. In this example, the flow vane 542 does not have a corrugation on either a first surface 550 or second surface (hidden from view). Rather, to determine wear due to cavitation on the valve body 514 and/or components of the control valve, a sensor 588, such as a ultrasonic transducer, may be used to measure the wear due to cavitation of the flow vane 542 (or erosion in a flow-up valve). In the illustrated example, an array of sensors 588 are embedded or installed in or on a wall 592 (e.g., in between interior and exterior surfaces of the valve body 514, on an interior surface of the valve body 514, on the exterior surface of the valve body 514) of the valve body 514 and are spaced along a length L of the flow vane 542. At each location along the length L, the ultrasonic transducer 588 can measure a thickness T or width W of the flow vane 542. Additionally, one or more additional sensors 588 may be installed or embedded in the flow vane 542 for measuring the thickness T of the vane 542 along its length L. Taking multiple measurements over time at each location will provide data to an operator to determine the rate of wear or the severity of wear due to cavitation that may be impacting the valve body 514 and/or components of the control valve. Wear due to cavitation will primarily show at an edge 596 of a first end 558, and the edge 596 moves (due to wear) in a D direction over time. Wear on the flow vane 542 can be measured by determining the change in location of the edge 596 in the D direction. For example, an initial measurement taken by an ultrasonic transducer 588 would be compared with a second measurement taken by the ultrasonic transducer 588. The change in value between the first and second measurements would indicate a change in distance or location of the outer edge 596. As the damage progresses, the change in distance or location of the outer edge 596 would increase. These diagnostics may be automated in a system with a digital valve controller, which is discussed further below. In one example, one or more of the flow vane 542 and the valve body 514 may provide sensors 588 for measuring wear. In yet another example, a combination of sensors in the vane 542, the valve body 514, and/or other valve components may be embedded or installed for measuring wear or taking other diagnostics of the valve.

Impact on the control valve 10, 410 due to cavitation can also be determined by measuring the change in travel of the control element 46, 446. As previously described, a flow vane 42, 142, 242, 342, 442, 542 improves flow condition and stability, and therefore efficiency, of the valve 10, 410. Therefore, any damage to the flow vane 42, 142, 242, 342, 442, 542 would decrease the efficiency of the valve 10, 410. Generally, a change in flow coefficient causes the valve 10, 410 to adjust the travel of the control element 46, 446 accordingly. This change in travel could be measured and tracked to determine the performance of the valve 10, 410.

Any of the flow vanes 42, 142, 242, 342, 442, 542 and valve bodies 14, 114, 214, 314, 414, 514 may be used in either a flow-up or a flow-down control valve according to the teachings of the present disclosure. Further, a combination of the various devices or methods disclosed herein may be used to determine deterioration or wear due to cavitating or erosive fluid flow. For example, any of the valve bodies 14, 114, 214, 314, 414, 514 and/or flow vanes 42, 142, 242, 342, 442, 542 previously described may be paired with one or more sensors, e.g., ultrasonic transducer, laser displacement sensor, vibration sensor, etc., to measure damage due to cavitation or erosion. One sensor or an array of sensors may be placed on or embedded in a wall of the valve body 14, 114, 214, 314, 414, 514, or in other examples, one or more sensors may be coupled to the control element 46, 446 (e.g., embedded in the valve plug 47, 447 or valve stem 48, 448).

In other examples, each of the process control valves 10, 410 disclosed herein may be coupled to an actuator 104 and communicatively coupled to a digital valve controller ("DVC"). The DVC may be a Fisher® FIELDVUE™ DVC 6200 Digital Valve Controller, a Fisher® FIELDVUE™ DVC 6000 Digital Valve Controller, or another type of Digital Valve Controller (e.g., a Digital Valve Controller manufactured by Fisher or by another company). The digital valve controller includes a processor, a memory, a communications interface, computing logic, an I/P converter, and a pneumatic relay disposed within a module base. One of ordinary skill in the art will appreciate that the digital valve controller can also include additional components, such as, for example, analog-digital converters, digital-analog converters, amplifiers, and gauges, which are not explicitly depicted herein.

The processor may be a general processor, a digital signal processor, ASIC, field programmable gate array, graphics processing unit, analog circuit, digital circuit, or any other known or later developed processor. The processor operates pursuant to instructions in the memory. The communications interface, which may be, for example, a HART® interface, a FOUNDATION™ fieldbus interface, a PROFIBUS® interface, or some other port or interface, is provided to enable or facilitate electronic communication between the digital valve controller and a process controller and between the digital valve controller and other components of the process control device (e.g., the valve 10 and the actuator). This electronic communication may occur via any known communication protocol, such as, for example, the HART® communication protocol, the FOUNDATION™ fieldbus communication protocol, the PROFIBUS® communication protocol, or any other suitable communication protocol.

The logic includes one or more routines and/or one or more sub-routines, embodied as computer-readable instructions stored on the memory. The digital valve controller, particularly the processor thereof, can execute the logic to cause the processor to perform actions related to the operation (e.g., control, adjustment), maintenance, diagnosis, and/or troubleshooting of the control valve assembly (e.g., the control valve 10, the actuator, and/or the components thereof). The logic may, when executed, cause the processor to obtain data associated with and indicative of the operation of the control valve 10. In this application, the data associated with the control device 10 may be related to change in thickness T of the flow vane 42, distance between the valve plug 47 and the flow vane 42, and changes in pressure, valve travel, and flow rate.

The processor may obtain data indicative of characteristics or properties of, for example, the valve body 14 or flow vane 42 at one point in time (e.g., a current time, a previous time). The processor may, for example, obtain data indicative of changes in thickness T of the flow vane 42, distance between the valve plug 47 and the flow vane 42, pressure, valve travel, and flow rate at the one point in time. For example, the data may be data measured or collected by one or more sensors (e.g., ultrasonic transducer, laser displacement sensor, vibration sensor, etc.). The data may be automatically transmitted to the processor (i.e., automatically obtained by the processor) and/or obtained in response to a request transmitted by the processor. In addition to obtaining data measured at one-point in time, the logic may, when executed, cause the processor to gather or collect data over a period of time (e.g., one week, one month, etc.). This generally involves obtaining the data associated with the control valve 10 measured or collected, as described above, at two or more different points in time as described above. The obtained data may be measured at pre-determined intervals (e.g., every 5 seconds), such that the two or more different points in time are separated by the pre-determined intervals. Once obtained, the data may be stored in the memory or in another memory. In turn, the processor may aggregate, accumulate, or sum some or all of the obtained data.

To assess the state of the one or more components, the data may be compared with other data and/or a quality factor or threshold. The other data may, for example, include empirical data and/or expected data (e.g., expected values). The empirical data may be or include previous flow vane thickness data, flow vane length data, flow rate data, and/or pressure data associated with one or more components of the control valve 10. Any data that deviates from the previous data may indicate that one or more of the components are not functioning effectively and/or being exposed to different levels of cavitating fluid, particulates, pollutants, and/or moisture than before, which may bear on the health and/or effectiveness of the one or more components. The expected data may be or include average or expected flow vane thickness data, flow vane length data, flow rate data, and/or pressure data typically expected in connection with the control valve 10. Any data that deviates from the expected data may indicate that one or more of the components are being exposed to abnormal cavitation, particulates, pollutants, and/or moisture, and, thus, are not currently in good health and/or are not likely to effectively function much longer. The factor or threshold may, for example, be a maximum threshold (e.g., a maximum change in flow vane thickness, a maximum change in travel, etc.) that the aggregated data is not to exceed. When, for example, the flow vane 42 thickness data indicates that the flow vane has deteriorated from wear to a thickness less than a minimum thickness threshold, it can be determined that the one or more components may need to be soon replaced.

By monitoring data and/or analyzing changes thereto as described herein, performance issues (e.g., leaks) and/or abnormalities in the control valve 10 can be quickly identified or predicted and remedied. By assessing the state of one or more components as described herein, faulty or otherwise non-effective components can be identified and removed or repaired and the future effectiveness and/or health of components can be estimated, thereby improving the performance of the control valve 10.

Based on the foregoing, undesirable effects of cavitation may be identified and avoided. The disclosed devices and methods may facilitate monitoring the flow condition of the process fluid as well as notifying an operator of the effects of cavitation, indicating whether the valve body 14, 114, 214, 314, 414, 514 or other components of the control valve 10, 410 need maintenance or need replacement. In the examples illustrated in FIGS. 1-6, each flow vane 42, 142, 242, 342, 442 provides a visual indication of wear due to cavitation, and in the example of FIG. 7, wear due to cavitation can be determined without disassembling the control valve.

The figures and description provided herein depict and describe preferred embodiments of a flow vane and control valve for purposes of illustration only. One skilled in the art will readily recognize from the foregoing discussion that alternative embodiments of the components illustrated herein may be employed without departing from the principles described herein. Thus, upon reading this disclosure, those of skill in the art will appreciate still additional alternative structural and functional designs for flow vanes of a valve body. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. A flow control device comprising:
a valve body having an inlet, an outlet, and a flow path connecting the inlet and the outlet;
a flow vane coupled to the valve body and disposed in the flow path to divide a flow of fluid through the valve body, the flow vane having a first surface, a second surface, and a corrugation formed on at least one of the first and second surfaces;
a control element disposed in the flow path and movable in the valve body between an open position and a closed position; and
further comprising a sensor coupled to the flow vane to measure wear on the flow vane.

2. The flow control device of claim 1, wherein the flow vane is disposed between the control element and the outlet.

3. The flow control device of claim 1, wherein the corrugation includes a ridge disposed in parallel relative to the direction of flow.

4. The flow control device of claim 1, wherein the corrugation includes a ridge disposed perpendicularly relative to the direction of flow.

5. The flow control device of claim 1, wherein the corrugation includes a raised peak.

6. The flow control device of claim 1, wherein the corrugation includes an indentation.

7. The flow control device of claim 1, wherein the flow vane is integrally formed with the valve body.

8. The flow control device of claim 1, further comprising an ultrasonic transducer coupled to the valve body and configured to measure a thickness of the flow vane.

9. A flow control device comprising:
a valve body having an inlet, an outlet, and a flow path connecting the inlet and the outlet;
a flow vane coupled to the valve body and disposed in the flow path to divide a flow of fluid through the valve body, the flow vane having a first surface, a second surface, and a corrugation formed on at least one of the first and second surfaces;
a control element disposed in the flow path and movable in the valve body between an open position and a closed position; and
further comprising a sensor coupled to the control element to measure a distance between the control element and a first end of the flow vane.

10. A valve body comprising:
an inlet, an outlet, and a flow path connecting the inlet and the outlet;
a valve port disposed between the inlet and the outlet;
an outlet passage connecting the valve port and the outlet;
a flow vane coupled to the valve body and disposed in the outlet passage, the flow vane having a corrugation disposed at a first end of the flow vane; and wherein the flow vane is integrally formed with and fixed with respect to the valve body.

11. The valve body of claim 10, wherein the corrugation includes a ridge disposed in parallel relative to a direction of flow.

12. The valve body of claim 10, wherein the corrugation includes a plurality of raised bumps.

13. The valve body of claim 10, wherein the corrugation includes a ridge perpendicularly disposed relative to a direction of flow.

14. The valve body of claim 10, wherein the corrugation is formed on a first surface and a second surface of the flow vane.

15. A valve body comprising:
an inlet, an outlet, and a flow path connecting the inlet and the outlet;
a valve port disposed between the inlet and the outlet;
an outlet passage connecting the valve port and the outlet;
a flow vane coupled to the valve body and disposed in the outlet passage, the flow vane having a corrugation disposed at a first end of the flow vane; and
further comprising a sensor coupled to the flow vane to measure a thickness of the flow vane.

16. The valve body of claim 15, further comprising an array of sensors coupled to the valve body and configured to measure a thickness of the flow vane, wherein each sensor is arranged along a length of the flow vane.

17. A method of determining wear due to cavitation, the method comprising:
providing a flow control device having a valve body with an inlet, an outlet, and a flow path connecting the inlet and the outlet, a control element disposed in the flow path and movable in the valve body between an open position and a closed position, and a flow vane coupled to the valve body and disposed in the flow path to divide a flow of fluid through the valve body, the flow vane having a first surface, a second surface, and a corrugation formed on at least one of the first and second surfaces;
measuring a dimension of the flow vane at a location along a length of the flow vane;
comparing a first measurement and a second measurement of the dimension of the flow vane taken at the location;
determining wear on flow vane based on comparing the first and second measurements of the dimension.

18. The method of claim 17, wherein measuring a thickness includes using an ultrasonic transducer to measure the thickness of the flow vane at the location.

* * * * *

UNITED STATES PATENT AND TRADEMARK OFFICE
CERTIFICATE OF CORRECTION

PATENT NO. : 11,608,909 B2
APPLICATION NO. : 16/791074
DATED : March 21, 2023
INVENTOR(S) : Paul T. Alman et al.

Page 1 of 1

It is certified that error appears in the above-identified patent and that said Letters Patent is hereby corrected as shown below:

In the Specification

At Column 4, Line 62, "damage to of" should be -- damage to --.

At Column 7, Line 9, "a ultrasonic" should be -- an ultrasonic --.

Signed and Sealed this
Twenty-seventh Day of August, 2024

Katherine Kelly Vidal
*Director of the United States Patent and Trademark Office*